No. 843,589. PATENTED FEB. 12, 1907.
C. W. DUER.
REVERSING AND CHANGE SPEED GEAR FOR AUTOMOBILES.
APPLICATION FILED MAY 24, 1906.
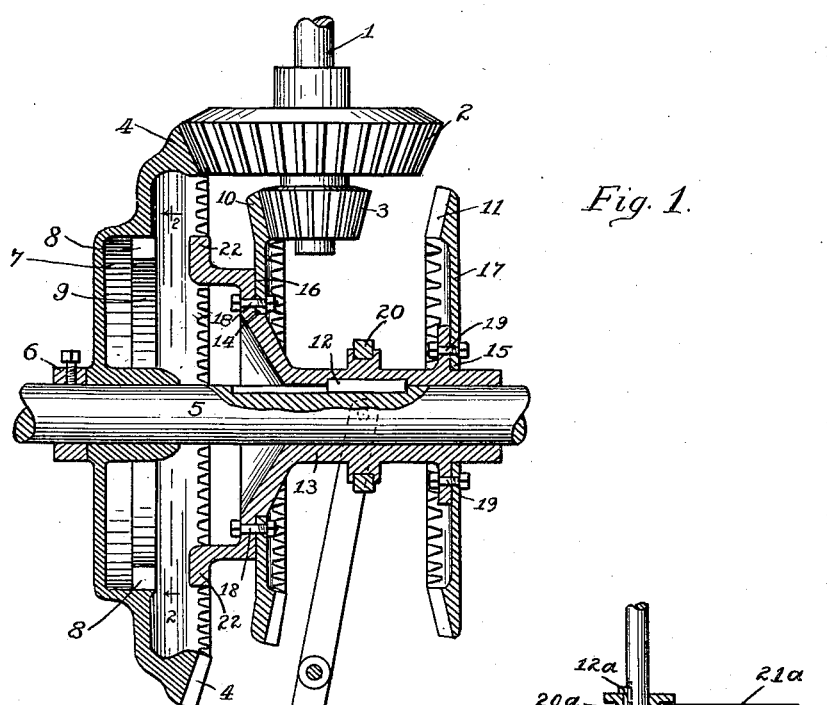
Fig. 1.
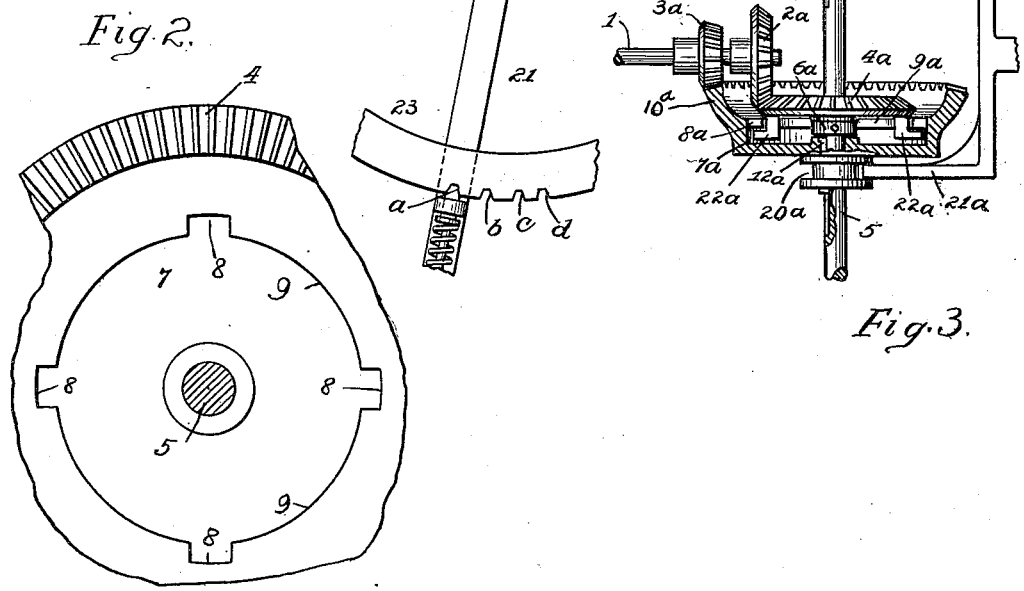
Fig. 2.
Fig. 3.
Witnesses:
John Braunwalder
R. B. MacIntosh
Inventor:
Charles William Duer
By Smith H. Parkinson
Atty.

UNITED STATES PATENT OFFICE.

CHARLES WILLIAM DUER, OF CHICAGO, ILLINOIS.

REVERSING AND CHANGE-SPEED GEAR FOR AUTOMOBILES.

No. 843,589.          Specification of Letters Patent.          Patented Feb. 12, 1907.

Application filed May 24, 1906. Serial No. 318,497.

*To all whom it may concern:*

Be it known that I, CHARLES WILLIAM DUER, a citizen of the United States, residing at Chicago, in the county of Cook and State of Illinois, have invented certain new and useful Improvements in Reversing and Change-Speed Gear for Automobiles, of which the following is a specification.

The invention relates to mechanism whereby the speed of a driving-shaft may be increased at will or its direction of rotation reversed or the drive be entirely disconnected, as may be necessary or desirable, all by the action of a single controlling-lever; and it has for its object greater simplicity, reliability, and compactness of parts and more ready control. For the purpose of explaining it and because it is peculiarly adapted to such a construction, I have illustrated it as applied to an organization such as shown in Letters Patent No. 820,102, granted to me on the 8th day of May, 1906, wherein a centrally-located fore-and-aft power-shaft is connected by bevel-gearing to a transverse driving-shaft, by which motion is communicated to the traction-wheels.

In the drawings, Figure 1 is a central horizontal section, except as to the shafts and gear-wheels keyed to the power-shaft, through mechanism embodying my invention in the best form now known to me; Fig. 2, a detail of construction; and Fig. 3, a section similar to that of Fig. 1, but illustrating an alternative form or modification of said invention.

Referring now to said drawings, the numeral 1 indicates the aforesaid power-shaft, having keyed thereto a large bevel gear 2 and a smaller bevel gear or pinion 3, the former of which engages constantly with a large wheel 4, mounted loosely upon the driving-shaft 5, but held in mesh with its driver on the power-shaft by a collar 6, secured to the driven shaft. Assuming the position of parts to be as shown in Fig. 1, the bevel-gear 4 is deeply cupped a short distance within the range of its teeth and concentric therewith to form a chamber 7, the one side, herein shown as the right-hand side, of which is partially closed by a clutch-rim 9 with counter clutch-openings 8 for a purpose presently explained. The proportion of gear 2 to gear 4 may be anything practical, but may be supposed to be two and a half turns of the power-shaft to one of the gear.

Mounted upon the driving-shaft, one on each side of the bevel-pinion 3, are two equal-sized bevel-gears 10 and 11, splined to said shaft at 12, so that one or the other may be brought into engagement with the pinion, the first for low-speed driving and the second for reversing. In the preferable construction (shown in Fig. 1) these latter gear-wheels are rigidly united to each other by a hub 13, with which the spline engages and which is formed with seats 14 and 15, in which annular webs 16 and 17 of the gear-wheels are secured by bolts 18 and 19, permitting the engaging-faces of the gears to be cut on ordinary gear-cutting mechanism. The hub is provided with an annularly-grooved collar 20 for shifting purposes, receiving the yoke of a suitably-controlled shifting-lever 21, which is also a locking-lever, to hold the hub in any of the positions required. Said hub also has clutch-teeth 22 to engage with the clutch-openings 8 of clutch-rim 9 and to be passed through them into chamber 7 when the driving-shaft is to be reversed by engagement of wheel 11 with the pinion 3 of the power-shaft. The speed of this pinion may be as four and one-half to one of the wheels 10 and 11 or any other ratio found advisable for the purpose.

Now supposing the lever to be engaged with notch *a* of its locking-segment 23 and the gear-wheel 10 to be in mesh with pinion 3, driving the machine at slow speed, and it is desired to disconnect the shaft 5 from its driver, either to gradually slow down or preparatory to connecting with the fast drive or for any other purpose, the lever is moved to the right and engaged with its second locking-notch *b*, thus disengaging the wheel 10 from the pinion and bringing the clutch-teeth 22 in close up to but not in contact with the clutch-rim 9; but if it is intended to bring the high-speed drive into operation the lever 21 is pressed toward its third notch *c* until the clutch is fully engaged and is then locked with said notch, while if it is necessary to reverse the machine the lever is moved to the fourth notch *d*, throwing the clutch-teeth 22 into the chamber 7, disengaging the high-speed wheel 4, and bringing the reversing-wheel 11 into mesh with the pinion 3 on the power-shaft.

Instead of the construction shown in Fig. 1 and immediately above described that indicated in Fig. 3 may be adopted. Herein the pinion and gear-wheel on the power-shaft are changed in position, the gear-wheel 2ª being at the extreme end of the shaft and the pinion $3^a$ being inside of it in the relative position occupied by the gear-wheel 2 in Fig. 1. The high-speed gear $4^a$ is loose upon shaft 5, as before, and is held in engagement with gear $2^a$ by collar $6^a$; clutch-teeth $22^a$ are upon its outer face; the slow-drive wheel and reversing-wheel are independently splined to shaft 5, the former (designated as $10^a$) being outside of the high-speed gear and having the annular recess $7^a$ and clutch-rim $9^a$ upon its deeply-cupped inner face, while the latter $11^a$ occupies its former relative position, but is also deeply cupped, the object and effect of the double cupping being to give room for the large gear $2^a$ when either of the two wheels are thrown into mesh with the pinion. The hubs of wheels $10^a$ and $11^a$ have each peripheral grooves $20^a$ to receive arms from a lever-frame $21^a$, which is operable by the formerly-described movements necessary to the potential operation of the apparatus—that is to say, a movement to disengage the slow-speed wheel from its driving-pinion, a movement to engage its clutch-teeth with the clutch element of the high-speed wheel, and a final movement to disengage the clutch elements and mesh the reversing-wheel with the pinion.

Having thus described my invention, and premising that under certain circumstances the reversing-wheel may be omitted and other changes of construction made or introduced without departing from its scope, what I claim, and desire to secure by Letters Patent of the United States, is—

1. The combination of a power-shaft, a driven shaft operated thereby, a bevel gear-wheel on the power-shaft and also a pinion of lesser diameter and number of teeth, a bevel-gear loosely mounted upon the driven shaft and held in constant engagement with the gear-wheel on the power-shaft, a bevel-gear splined to the driven shaft and adapted to be engaged with, or disengaged from, the pinion to rotate in the same direction as the loose gear, opposing clutch elements upon the two gears of the driven shaft, and means whereby the splined gear may be engaged with its pinion, disengaged therefrom to throw the driven shaft out of action, and its clutching element engaged with the converse element of the loose gear to connect the latter to the driven shaft and increase the speed of drive.

2. The combination of a power-shaft, a transverse driven shaft operated thereby, a bevel-gear and a pinion of lesser diameter on the power-shaft, a bevel-gear loosely mounted upon the driven shaft and held in constant mesh with the gear on the power-shaft, a bevel-gear splined to the driven shaft and adapted to be meshed with the pinion to rotate in the same direction as the loose gear, opposing clutch elements upon these two latter gears, a third gear splined to the driven shaft and adapted to be meshed with the reverse side of the pinion, and means whereby the first splined gear may be engaged with the pinion, disengaged therefrom, clutched to the loose gear, and finally unclutched therefrom and the second splined gear concurrently meshed with the pinion to reverse the drive.

3. The combination of a power-shaft, a transverse driven shaft operated thereby, a bevel-gear and a pinion of lesser diameter on the power-shaft, a bevel-gear loosely mounted upon the driven shaft and held in constant mesh with the gear on the power-shaft, a couple of bevel-gears rigidly connected together on opposite sides of the pinion and splined to the driven shaft to be thrown, one or the other into mesh with said pinion, to drive or reverse said shaft, a clutch element upon the driver of said couple, a converse clutch element upon the loose gear, there being an annular recess or chamber provided between said latter clutch element and the body of the loose gear, and means whereby the splined pair of gears may be operated, first to engage the driving member with the pinion, next to move it away therefrom, then to engage the clutch elements, and finally to disengage said elements and mesh the reversing member of the pair with the pinion.

CHARLES WILLIAM DUER.

Witnesses:
JOSEPH G. PARKINSON,
J. E. O'DONNELL.